Patented July 22, 1952

2,603,839

UNITED STATES PATENT OFFICE 2,603,839

METHOD OF FORMING FILAMENTS OF METAL SALTS OF CELLULOSE SULFATE

John R. Caldwell, Kingsport, Tenn., assignor to Eastman Kodak Company, Rochester, N. Y., a corporation of New Jersey No Drawing. Application November 12, 1949, Serial No. 126,911

4 Claims. (Cl. 18—54)

This invention relates to a method of forming filaments of metal salts of cellulose sulfate which are both fire-resistant and resistant to the effects of boiling water. One object of my invention is to provide a fire-resistant derivative of cellulose. Another object of my invention is to provide a method for preparing water resistant filaments in which a water-soluble salt of cellulose sulfate is spun into a non-solvent and then treated with a water-soluble aluminum or zirconyl salt. A further object of my invention is to provide a material which is resistant to the effects of boiling water.

The objects of my invention are accomplished by treating cellulose sulfate or its water-soluble salt with a soluble compound of aluminum or zirconium. The cellulose sulfate which is suitable for use as a starting material in accordance with my invention may be a compound such as prepared by the process of Malm and Crane U. S. Patent No. 2,539,451 or U. S. Patent No. 2,559,914 of Frank. Any of the water-soluble salts of the cellulose sulfate may be used, such as the sodium, ammonium, calcium, or magnesium salt. Aluminum salts which may be reacted with the cellulose sulfate salt are aluminum chloride, aluminum sulfate, aluminum nitrate, etc. The zirconium salts employed are those containing the zirconyl ion ($ZrO^{++}$), such as zirconyl chloride ($ZrOCl_2$) or zirconyl sulfate ($ZrOSO_4$). Fibers or filaments of aluminum or zirconium salts of cellulose sulfate are characterized by both resistance to fire and resistance to the effects of boiling water.

The preparation of aluminum or zirconyl salts of cellulose sulfate may be accomplished by reacting a water solution of cellulose sulfate containing 5–10% of combined sulfur with water solutions of the salts, such as specified above. Upon thoroughly mixing these salts a precipitate forms and may be separated from the liquid present and washed resulting in aluminum or zirconyl salts of cellulose sulfate which are resistant to the action of water even at temperatures of 90–100° C. In addition, these salts will not support combustion and, therefore, are useful as launder-resistant, fire-proofing agents. One useful method of preparing these salts is by forming a coating or precipitate thereof directly on the surface to be treated. For example, a cotton fabric is coated with a solution of sodium cellulose sulfate and the fabric is then immersed in a dilute aqueous solution of zirconium oxychloride to precipitate a layer of the insoluble zirconyl cellulose sulfate on the cotton. Alternatively, the cotton cloth can first be treated with a solution of zirconium oxychloride and then immersed in a solution of sodium cellulose sulfate.

A convenient method for the preparation of the aluminum salts of cellulose sulfate is evaporating a solution of ammonium cellulose sulfate and aluminum acetate or aluminum formate. The film may be heated at 110–120° C., thus driving off the ammonium acetate and forming an insoluble film of aluminum cellulose sulfate. Another convenient method which may be used, if film or sheeting is desired, is by casting a water dope of sodium cellulose sulfate on plates, immersing the plates in acetone or ethyl alcohol to precipitate the cellulose sulfate, and then immersing in an aqueous solution of zirconium oxychloride. A transparent film of zirconyl cellulose sulfate is obtained which upon drying is found to possess excellent resistance to boiling water. Fibers of zirconyl cellulose sulfate can be made by a process similar to that described for the preparation of films, which fibers can be woven into fabrics, cords, tapes or the like which are resistant both to fire and to hot water. Films of aluminum or zirconyl cellulose sulfate can be laminated with cotton fabrics, paper, or the like, to give products having improved fire resistance. Tapes, ropes, cords, and ribbons of flammable materials, such as cotton, viscose and hemp can be coated with the salts of my invention to give fire-resistant products. If desired, softeners or plasticizers, such as glycerine, diethylene glycol, sodium lactate, or sorbitol can be incorporated in the fire-proofing compositions of my invention.

The following examples illustrate my invention:

*Example 1.*—Cellulose sulfate having a sulfur content of 8% was converted to the sodium salt and dissolved in water to give a viscous solution containing 12–15% solids. The solution was coated on plates and the plates were soaked in acetone for thirty minutes. The films were then stripped from the plates and immersed for one hour in a 3% aqueous solution of zirconium oxychloride. The films were then washed in water and dried at 110° C. The dried films were transparent and remained in that condition after boiling fifteen minutes in water.

*Example 2.*—Cellulose sulfate having a sulfur content of 6.5% was converted to the sodium salt and was dissolved in water to give a solution containing 15% solids. The solution was extruded through a spinneret into a bath of acetone. The filaments were carried from the acetone bath into a 5% aqueous solution of zirconium oxychloride. The hardened filaments were then carried through a wash bath and dried. The yarn which was composed of zirconyl cellulose sulfate was insoluble in hot water and would not support combustion.

*Example 3.*—Ten parts of ammonium cellulose sulfate and one part of aluminum acetate were dissolved in 100 parts of water. The solution was coated on a glass plate and heated at 50–60° C. to evaporate the water. The clear film was then heated at 100–110° C. for thirty minutes. The film was insoluble in water.

I claim:

1. A method of preparing water-resistant filaments which comprises extruding an aqueous solution of a water-soluble salt of cellulose sulfate through a spinnerette into a non-solvent therefor and then transferring the filaments thus formed into an aqueous solution of a salt selected from the group consisting of water-soluble aluminum salts and water-soluble zirconyl salts.

2. A method of preparing water-resistant filaments which comprises extruding an aqueous solution of a water-soluble salt of cellulose sulfate through a spinneret into a nonsolvent therefor, and then transferring the filaments thus formed into an aqueous solution of a water-soluble aluminum salt.

3. A method of preparing water-resistant filaments which comprises extruding an aqueous solution of a water-soluble salt of cellulose sulfate through a spinneret into a nonsolvent therefor, and then transferring the filaments thus formed into an aqueous solution of a water-soluble zirconyl salt.

4. A method of preparing water-resistant filaments which comprises extruding an aqueous solution of sodium cellulose sulfate through a spinneret into acetone and then transferring the filaments thus formed into an aqueous solution of a salt selected from the group consisting of water-soluble aluminum salts and water-soluble zirconyl salts.

JOHN R. CALDWELL.

REFERENCES CITED

The following references are of record in the file of this patent:

UNITED STATES PATENTS

| Number | Name | Date |
|---|---|---|
| 1,804,417 | Herting | May 12, 1931 |
| 2,328,431 | Doser et al. | Aug. 31, 1943 |
| 2,420,949 | Hager et al. | May 20, 1947 |
| 2,539,451 | Malm et al. | Jan. 30, 1951 |

FOREIGN PATENTS

| Number | Country | Date |
|---|---|---|
| 584,911 | Great Britain | Jan. 27, 1947 |

OTHER REFERENCES

"High Polymers," vol. V, "Cellulose and Cellulose Derivatives," Ott, 1943, pages 663, 665.